United States Patent [19]

Yamabe et al.

[11] Patent Number: 4,972,334
[45] Date of Patent: Nov. 20, 1990

[54] AUTOMATIC GENERATION METHOD OF A SIMULATION PROGRAM FOR NUMERICALLY SOLVING A PARTIAL DIFFERENTIAL EQUATION ACCORDING TO A BOUNDARY-FITTED METHOD

[75] Inventors: Michiru Yamabe, Hino; Chisato Konno, Inagi; Yukio Umetani, Hachioji, all of Japan

[73] Assignee: Hitachi, Ltd., Tokyo, Japan

[21] Appl. No.: 156,169

[22] Filed: Feb. 16, 1988

[30] Foreign Application Priority Data

Mar. 13, 1987 [JP] Japan .................................. 62-56504

[51] Int. Cl.$^5$ .......................................... G06F 15/32
[52] U.S. Cl. ................................ 364/200; 364/260.4;
364/260.9; 364/261; 364/191
[58] Field of Search ............... 364/200, 900, 300, 513,
364/191, 192

[56] References Cited

U.S. PATENT DOCUMENTS

| | | | |
|---|---|---|---|
| 4,580,229 | 4/1986 | Koyama et al. | 364/513 |
| 4,636,938 | 1/1987 | Broome | 364/191 |
| 4,730,258 | 3/1988 | Takeda et al. | 364/191 |
| 4,736,306 | 4/1988 | Christensen et al. | 364/191 |

OTHER PUBLICATIONS

Rice, J. R. et al., "Ellpack: Progress and Plans", Academic Press, 1981, pp. 135-162.

"Twodepep a Problem-Solving System for Partial Differential Equations", IMSL Inc., 3rd ed., 1982.

Umetani et al., "A Numerical Simulation Language for Vector/Parallel Processors", 1987, pp. 147-162.

Morris, S. M., "SALEM-A Programming System for the Simulation of Systems Described by Partial Differential Equations", Fall Joint Computer Conference, 1968, vol. 33, pp. 353-358.

Cardenas, A. F. et al., "A Language for Partial Differential Equations", Comm. ACM, vol. 13, No. 3, Mar. 1970.

*Primary Examiner*—Thomas C. Lee
*Attorney, Agent, or Firm*—Fay, Sharpe Beall, Fagan, Minnich & McKee

[57] ABSTRACT

A method is provided for automatically generating a simulation program which numerically solves a partial differential equation which governs a physical quantity in a non-rectangular real space domain. The real partial differential equation is solved according to a boundary-fitted method by first transforming the original partial differential equation from a real space to a normal space. The upper limit of user work area memory available on the data processing apparatus and the number of mesh points extracted from the real space domain shape are considered in the transformation and to an extent control the transformation rule. Two program statements are thus generated, the first of which allocates data area for the particular variables in the work area memory. The second program statement defines the value of each variable in terms of one factor. The final step combines the partial differential equation and the first and second program statements into a simulation program which is used to solve the original partial differential equation.

1 Claim, 11 Drawing Sheets

```
                    INFORMATION ON REAL COORDINATE
                                          PROGRAM
METHOD  BFM;
VAR     TT;
DOM     X=[-1:1],
        Y=[-1:1];
POINT   P1=(1,0.0),    P2=(0.707,0.707),
        P3=(0.0,1),    P4=(-0.707,0.707),
        P5=(-1,0.0),   P6=(-0.707,-0.707),
        P7=(0.0,-1),   P8=(0.707,-0.707);
REGION  R = ARC(P8,P1,P2),   L=ARC(P4,P5,P6),
        TO = ARC(P2,P3,P4),  B=ARC(P6,P7,P8),
        WHOLE = QUAD(R,L,TO,B);
TREG    WHOLE;
MESH    R=D(20),  L=D(20),  TO=D(20),
        B=D(20),  WHOLE =A,
TBOUND  R+L+TO+B;
NCORD   (B,L);
SCHEME ;
    SOLVE TT OF 0=LAPL(TT) BY 'GAUSS'; ─ PARTIAL
                                        DIFFERENTIATION EQUATION
END SCHEME ;
END ;
```

FIG. 3

```
                    INFORMATION ON NORMAL COORDINATE
                                          PROGRAM
PROG    DIRIC  ¥BFM;
METHOD  FDM;
DOM     X=[0:20], Y=[0:20];           DOMAIN SHAPE
MESH    X=[0:20:1], Y=[0:20:1];       INFORMATION
REGION  R=(20,[0:20]), L=(0,[0:20]),
        TO=([0:20],20), B=([0:20],0);
VAR     ¥¥X, ¥¥Y, ¥J2, ¥J2HYZ, ¥J2XHZ,
        ¥B211, ¥B212, ¥B221, ¥B222, ¥B211X,
        ¥B212X, ¥B221X, ¥B222X, ¥B211Y,
        ¥B212Y, ¥B221Y, ¥B222Y, TT;
SCHEME ;
    SOLVE TT OF
    0=+1/¥J2*¥B211*DX(1/¥J2*¥B211*DX(TT))     PARTIAL
     +1/¥J2*¥B211*DX(1/¥J2*¥B212*DY(TT))      DIFFERENTIAL
     +1/¥J2*¥B212*DY(1/¥J2*¥B211*DX(TT))      EQUATION
     +1/¥J2*¥B212*DY(1/¥J2*¥B212*DY(TT))
     +1/¥J2*¥B221*DX(1/¥J2*¥B221*DX(TT))
     +1/¥J2*¥B221*DY(1/¥J2*¥B222*DY(TT))
     +1/¥J2*¥B222*DY(1/¥J2*¥B221*DX(TT))
     +1/¥J2*¥B222*DY(1/¥J2*¥B222*DY(TT))
                    BY 'GAUSS';
END SCHEME ;
END ;
```

FIG. 4

| DIFFERENTIAL OPERATOR | DIFFERENTIAL OPERATOR EXPANSION RULE |
|---|---|
| $\nabla^2$ | $\dfrac{\partial^2}{\partial x^2} + \dfrac{\partial^2}{\partial y^2} + \dfrac{\partial^2}{\partial z^2}$ |
| $\nabla \cdot$ | $\dfrac{\partial}{\partial x} + \dfrac{\partial}{\partial y} + \dfrac{\partial}{\partial z}$ |
| $\nabla$ | $\left(\dfrac{\partial}{\partial x}, \dfrac{\partial}{\partial y}, \dfrac{\partial}{\partial z}\right)$ |
| $\nabla \times$ | $\left(\dfrac{\partial}{\partial y} - \dfrac{\partial}{\partial z}, \dfrac{\partial}{\partial z} - \dfrac{\partial}{\partial x}, \dfrac{\partial}{\partial x} - \dfrac{\partial}{\partial y}\right)$ |
| $\dfrac{\partial^2}{\partial x^2}$ | $\dfrac{\partial}{\partial x}\left(\dfrac{\partial}{\partial x}\right)$ |
| $\dfrac{\partial^2}{\partial y^2}$ | $\dfrac{\partial}{\partial y}\left(\dfrac{\partial}{\partial y}\right)$ |
| $\dfrac{\partial^2}{\partial z^2}$ | $\dfrac{\partial}{\partial z}\left(\dfrac{\partial}{\partial z}\right)$ |

FIG. 5

| MAPPING TRANSFOR-MATION OPERATOR | MAPPING TRANSFORMATION RULE |
|---|---|
| $\dfrac{\partial}{\partial x}$ | $\dfrac{1}{J} * (\beta 211 * \dfrac{\partial}{\partial \xi} + \beta 212 * \dfrac{\partial}{\partial \eta})$ |
| $\dfrac{\partial}{\partial y}$ | $\dfrac{1}{J} * (\beta 221 * \dfrac{\partial}{\partial \xi} + \beta 222 * \dfrac{\partial}{\partial \eta})$ |
| $J$ | $\dfrac{\partial x}{\partial \xi}\dfrac{\partial y}{\partial \eta} - \dfrac{\partial x}{\partial \eta}\dfrac{\partial y}{\partial \xi}$ |
| $\beta 211$ | $\dfrac{\partial x}{\partial \eta}$ |
| $\beta 221$ | $-\dfrac{\partial x}{\partial \eta}$ |
| $\beta 212$ | $-\dfrac{\partial y}{\partial \xi}$ |
| $\beta 222$ | $\dfrac{\partial x}{\partial \xi}$ |

EQUATION: $L[x,y](\phi) = 0 \longrightarrow L[F(\xi,\eta), G(\xi,\eta)](\phi) = 0$

REAL SPACE  NORMAL SPACE

X : REFERRED POINT WHEN $\frac{\partial x}{\partial \xi}$ IS DISCRETIZED BY O ⊠ : OVERLAPPING REFERRED POINT WHEN $\frac{\partial x}{\partial \xi}$ IS DISCRETIZED BY O AND △

```
                INFORMATION ON NORMAL COORDINATE PROGRAM

PROG     DIRIC  ¥ BFM;
METHOD   FDM;
DOM      X=[0:20] , Y=[0:20] ;             DOMAIN SHAPE
MESH     X=[0:20:1] , Y=[0:20:1] ;         INFORMATION
REGION   R=(20, [0:20] ) , L=(0,[0:20] ),
         TO=( [0:20] , 20),B=( [0:20] , 0);

VAR      ¥¥X, ¥¥Y, ¥J2, ¥B211, TT
¥J2HYZ, ¥J2XHZ, ¥B211X; ¥B212X, ¥B221X, ¥B222X
¥B211Y, ¥B212Y, ¥B221Y, ¥B222Y;

SCHEME:

¥J2=DX(¥¥X)*DY(¥¥Y)=DY(HX)*DX(¥¥Y);
¥B211=DY(¥¥Y);

SOLVE TT OF                                PARTIAL
0=+1/¥J2*¥B211*DX(1/¥J2*¥B211*DX(TT))      DIFFERENTIAL
  +1/¥J2*¥B211*DX(1/¥J2*¥B212*DY(TT))      EQUATION
  +1/¥J2*¥B212*DY(1/¥J2*¥B211*DX(TT))
  +1/¥J2*¥B212*DY(1/¥J2*¥B212*DY(TT))
  +1/¥J2*¥B221*DX(1/¥J2*¥B221*DX(TT))
  +1/¥J2*¥B221*DX(1/¥J2*¥B222*DY(TT))
  +1/¥J2*¥B222*DY(1/¥J2*¥B221*DX(TT))
  +1/¥J2*¥B222*DY(1/¥J2*¥B222*DY(TT))
              BY 'GAUSS';

END SCHEME ;
 END ;
```

AUTOMATIC GENERATION METHOD OF A SIMULATION PROGRAM FOR NUMERICALLY SOLVING A PARTIAL DIFFERENTIAL EQUATION ACCORDING TO A BOUNDARY-FITTED METHOD

BACKGROUND OF THE INVENTION

The present invention relates to an automatic generation system of a program for a numerical calculation for a physical model represented by a partial differential equation, and more particularly to a method for generating a program suitable for a boundary-fitted method for analyzing an arbitrary shape.

Since the program for the numerical calculation carries out mapping transformation by equations (generally partial differential equations) representing physical laws which govern a shape of a simulation domain and physical phenomena, in accordance with conditions at a boundary of the domain, it is highly troublesome to generate it by a program. Accordingly, it is desirable to automatically generate the program in accordance with simple input data.

Several such programs have been proposed, for example, by Morris, S. M. et al "SALEM-A Programming System for the Simulation of Systems Described by Partial Differential Equation", Proc. Fall Joint Computer Conf., Vol. 33, pages 353–358 (1968); Cardenas. A. F. et al "A language for partial Differential Equations", Comm. ACM, vol. 13, No. 3, ,pp 184–191 (1970.3); Rice, J. R. et al "ELLPACK progress and plans, in Elliptic Problem Solvers", pp 135–162, Academic Press (1981); IMSL Inc., "TWODEPEP : A finite Element Program"3rd ed (1982).

Since the above methods have limitations on the form of the partial differential equation, a program language called Differential Equation Solver and a program for generating a numerical simulation program by using such a program language have been proposed. For example, Umetani et al "A numerical Simulation Language for vector/parallel processors" (Ford et al : Problem Solving Environments for Scientific Computing Elsevier Science publishers B.V. (Holland) 1987, pp 147–162), describes a method for generating a program for numerical calculation for a partial differential equation to be simulated in accordance with a finite differential method. A method for generating a program in accordance with the finite differential method is also disclosed in Japanese Patent Application No. 61-54762 entitled "Automatic Apparatus for Numerical Calculation Procedure". It relates to a method for determining a DO loop when a FORTRAN numerical calculation program is automatically generated by the finite differential method.

A physical phenomenon is determined if a partial differential equation which governs an unknown physical quantity, a spatial domain which is a domain of the partial differential equation and a boundary condition or initial condition thereof are given. The numerical calculation for simulating the physical phenomenon on a computer can be performed by the finite differential method or a numerical analysis called a boundary-fitted method by defining the partial differential equation, the boundary condition, the spatial domain, mapping of the spatial domain, and discretization (to approximate physical quantities at mesh points governed by the partial differential equation) of differential operators contained in the partial differential equation, boundary condition and initial condition.

In the numerical simulation which uses a general purpose computer, it is impossible to realize the function only with the above information. Thus, a mechanism for automatically generating a program for controlling the general purpose computer in accordance with the above designation is provided so that the numerical simulation can be controlled with as less designation as possible.

SUMMARY OF THE INVENTION

In the finite differential method, orthogonal mesh points are spread over a given domain to be analyzed, and approximate solutions (referred to as discretization) cf the differential equations are calculated for the mesh points. As a result, the domain to be analyzed is limited to a rectangular domain or an aggregation of rectangles.

On the other hand, in the boundary-fitted method, a domain on a real (physical) space to be analyzed is mapping-transformed to a rectangle or an aggregation of rectangles, on a normal space and a partial differential equation for the real space is also mapping-transformed to a partial differential equation on a mapping space, and analysis is made on the mapping space by using the finite differential method. It is flexible to the shape of domain to be analyzed. However, the problems are involved in that (i) the mapping-transformation of the partial differential equation by a human being is difficult; (ii) the partial differential equation after the transformation is complex, the discretization process on the normal space is difficult to a great extent as compared with the finite difference method; and, (iii) the partial differential equation after discretization becomes large in length, the time required for executing the program becomes long in proportion to the length of the program.

It is an object of the present invention to provide a method for automatically generating a program for numerical simulation by using a boundary fitted method which does not involve the above-mentioned problems (i) to (iii).

In the prior art method for automatically generating a program, when a partial differential program and a boundary condition are given, a program for simulation by the finite differential method is automatically generated. The boundary-fitted method coordinate-transforms the domain on the real space to be analyzed to a rectangle or an aggregation of rectangles on a normal space and solves the partial differential equation which governs the physical phenomenon on the normal space by the finite differential method. In order to automatically generate the simulation program by the boundary-fitted method, it is effective to automatically generating a partial differential equation in a normal space and a boundary condition and a description of a domain from a partial differential equation in a real space and a boundary condition and a description of a domain, and furthermore, to automatically generating a calculation program for performing simulation by the finite difference method from the description of the normal space.

The present invention relates to a method for automatically generating the above program and is characterized by automatic transformation of the partial differential equation in the real space to the partial differential equation in the normal (transformed) space.

Figure 9:
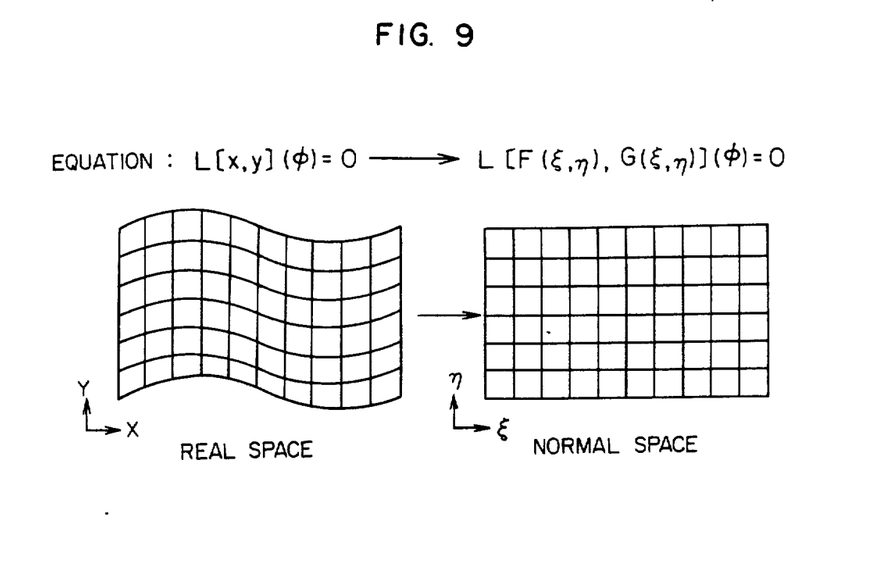
FIG. 9 illustrates mapping transformation.

A two-dimension system is explained below, as an example, as shown in FIG. 9, a coordinate system in the real space is represented by (x, y) and a coordinate system in the normal space is represented by ($\xi$, $\eta$), and coordinate variables x and y are represented by functions of Coordinate variables $\xi$ and $\eta$ in the normal space. In particular, in mapping transforming a partial differential equation in the real space into a partial differential equation in the normal space, it is utilized that differential operators $\partial/\partial x$ and $\partial/\partial y$ in the real space can be expressed by differential operators $\partial/\partial\xi$ and $\partial/\partial\eta$ in the normal space. In other words, as is well known, from $$\frac{\partial}{\partial \xi} = \frac{\partial}{\partial x}\frac{\partial x}{\partial \xi} + \frac{\partial}{\partial y}\frac{\partial y}{\partial \xi}$$

$$\frac{\partial}{\partial \eta} = \frac{\partial}{\partial x}\frac{\partial x}{\partial \eta} + \frac{\partial}{\partial y}\frac{\partial y}{\partial \eta}$$

we get $$\begin{pmatrix}\frac{\partial}{\partial \xi}\\ \frac{\partial}{\partial \eta}\end{pmatrix} = \begin{bmatrix}\frac{\partial x}{\partial \xi} & \frac{\partial y}{\partial \xi}\\ \frac{\partial x}{\partial \eta} & \frac{\partial y}{\partial \eta}\end{bmatrix}\begin{pmatrix}\frac{\partial}{\partial x}\\ \frac{\partial}{\partial y}\end{pmatrix} \quad (1)$$

In the formula (1), $$\begin{bmatrix}\frac{\partial x}{\partial \xi} & \frac{\partial y}{\partial \xi}\\ \frac{\partial x}{\partial \eta} & \frac{\partial y}{\partial \eta}\end{bmatrix} = J \text{ (Jacobian)}$$

$$\begin{pmatrix}\frac{\partial}{\partial x}\\ \frac{\partial}{\partial y}\end{pmatrix} = J^{-1}\begin{pmatrix}\frac{\partial}{\partial \xi}\\ \frac{\partial}{\partial \eta}\end{pmatrix}$$

$$= \frac{1}{\frac{\partial x}{\partial \xi}\frac{\partial y}{\partial \eta} - \frac{\partial x}{\partial \eta}\frac{\partial y}{\partial \xi}}$$

$$\begin{bmatrix}\frac{\partial y}{\partial \eta} & -\frac{\partial y}{\partial \xi}\\ -\frac{\partial x}{\partial \eta} & \frac{\partial x}{\partial \xi}\end{bmatrix}\begin{pmatrix}\frac{\partial}{\partial \xi}\\ \frac{\partial}{\partial \eta}\end{pmatrix}$$

Therefore, $$\frac{\partial}{\partial x} = \quad (2)$$

$$\frac{1}{\frac{\partial x}{\partial \xi}\frac{\partial y}{\partial \eta} - \frac{\partial x}{\partial \eta}\frac{\partial y}{\partial \xi}}\left(\frac{\partial}{\partial \xi}\frac{\partial y}{\partial \eta} - \frac{\partial}{\partial \eta}\frac{\partial y}{\partial \xi}\right)$$

$$\frac{\partial}{\partial y} = \quad (3)$$

$$\frac{1}{\frac{\partial x}{\partial \xi}\frac{\partial y}{\partial \eta} - \frac{\partial x}{\partial \eta}\frac{\partial y}{\partial \xi}}\left(-\frac{\partial}{\partial \xi}\frac{\partial x}{\partial \eta} + \frac{\partial}{\partial \eta}\frac{\partial x}{\partial \xi}\right)$$

are derived as is well known. Differential opera an arbitrary partial differential equation can be represented by a combination of primary differential operators $\partial/\partial x$ and $\partial/\partial y$. For example a second-order differentiation $\partial^2/\partial x^2$ can be represented by a combination of primary differential operators such as $\partial/\partial x(\partial/\partial x)$. Accordingly, an arbitrary partial differential equation in the real space can be mapping transformed into an equation of coordinates $\xi$ and $\eta$ in the normal space by using formulas (2) and (3) of relationships between the primary differentiations $\partial/\partial x$, $\partial/\partial y$ and $\partial/\partial\xi$, $\partial/\partial\eta$.

In the present invention, a first characteristic feature resides n that the mapping transformation of a partial differential equation using the above-mentioned relationship formulas is performed automatically.

Figure 10:
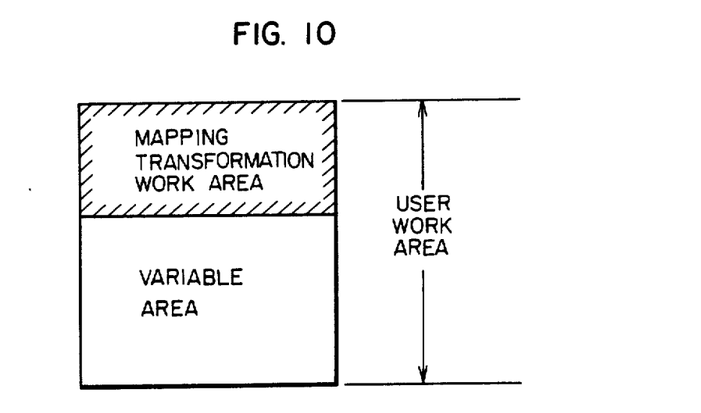
FIG. 10 shows a structure of a working memory when a numerical calculation program is to be executed.

In the present invention, a second characteristic feature resides in that a program can be generated in accordance with a memory capacity available in a computer which executes the automatically generated numerical calculation program by the boundary fitted method. For example, in a FORTRAN numerical calculation program, as shown in FIG. 10, the size of a working memory (or the size of a work area) in a computer in executing a calculation program of FORTRAN by the computer is determined by the number of variables used in the calculation program and the size of arrangement of each variable. That is, the working memory required corresponds to the number of variables x the size of arrangement x 4 bytes. The working memory area determined by this number of variables and the size of arrangement is referred to as an area of variable. The partial differential equation obtained by mapping transforming all differential operators $\partial/\partial x$, $\partial/\partial y$, $\partial^2/\partial x^2$, $\partial^2/\partial y^2$, etc. relating to the real space coordinates x and y into differential operators $\partial/\partial\xi$, $\partial/\partial\eta$, $\partial^2/\partial\xi^2$, $\partial^2/\partial\eta^2$, etc., relating to the normal space coordinates $\xi$ and $\eta$ by using the mapping transformation formulas (2) and (3) is very long in length, and $\partial x/\partial\xi$, $\partial y/\partial\xi$, $\partial x/\partial\eta$, $\partial y/\eta$, and $\partial x/\partial\xi \cdot \partial y/\partial\eta - \partial x/\partial\eta \cdot \partial y/\partial\xi$ appear in the equation many times, and at the time of executing the program, the same calculation must be repeated many times.

Accordingly, for each lattice point (mesh point), $\partial x/\partial\xi$, $\partial x/\partial\eta$, $\partial y/\partial\xi$, $\partial y/\partial\eta$ and $\partial x/\partial\xi \cdot \partial y/\partial\eta - \partial x/\partial\eta \cdot \partial y/\partial\xi$ are calculated only once at first in the calculation program of FORTRAN, and thereafter, the result of the calculation is referenced. By doing so, the calculation of $\partial/\partial x \cdot \partial/\partial y$ can be omitted, and the processing speed is effectively improved.

More specifically, $\partial x/\partial\xi$, $\partial x/\partial\eta$, $\partial y/\partial\xi$, $\partial y/\partial\eta$ and $\partial x/\neq\xi \cdot \partial x/\partial\eta - \partial x/\partial\eta \cdot \partial y/\partial\xi$ in the formulas (2) and (3) are calculated beforehand for each lattice point in the normal space, and the calculated results are stored in a table in a work area (hatched area in FIG. 10) in a memory of a computer which execute the numerical calculation program. Thereafter, instead of calculating the value of the term anew, it is preferable to generate the numerical calculation program of FORTRAN so that the table is referenced. However, actually, a sufficient area for storing the values of all the terms is not necessarily available in the work area. Therefore, in the present invention, it is designed to automatically decide which of $\partial x/\partial\xi$, $\partial x/\partial\eta$, $\partial y/\partial\xi$, $\partial y/\partial\eta$ and $\partial x/\partial\xi \cdot \partial y/\partial\eta - \partial x/\neq\eta \cdot \partial y/\iota\xi$ is to be stored in the table.

Figure 11:
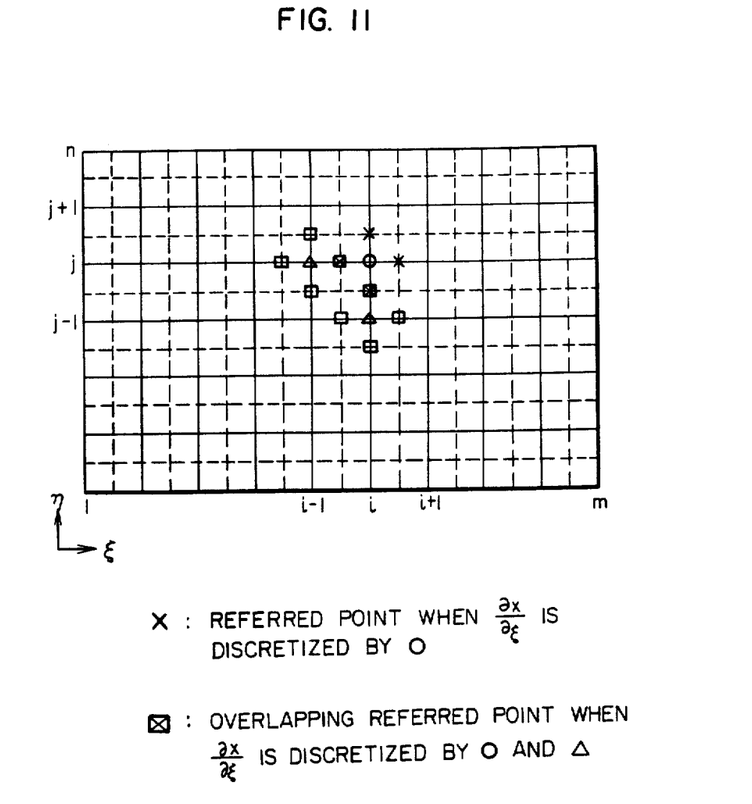
FIG. 11 illustrates a method for calculating a memory size.

Furthermore, in calculating $\partial/\partial\xi$ on each lattice point in a two-dimensional domain to be analyzed (domain in a normal coordinate) in FIG. 11, points around an object point is used to approximate a value on the lattice point (hereinafter, referred to as discretization). In the Figure, in discretizing $\partial/\partial\xi$ at (i, j), it is only necessary to hold the values of $\partial x/\partial\epsilon$, $\partial x/\xi\eta$, $\partial y/\partial\xi$, $\partial y/\partial\eta$ and $\partial x/\partial\xi \cdot \partial y/\partial\eta - \partial y/\partial\xi$ at five points of $(i+\kappa j)$, $(i-\frac{1}{2}, j)$, $(i, j+\frac{1}{2})$, $(i, j-\frac{1}{2})$, $(i, j)$. Considering all mesh points for $i = 1, \ldots, m$ and $j = 1, \ldots, n$, then three points, $$\left(\frac{\partial x}{\partial \xi}\right)_{i,j}, \left(\frac{\partial x}{\partial \xi}\right)_{i+1,j} \text{ and } \left(\frac{\partial x}{\partial \xi}\right)_{i,j+1} \text{ need be stored}$$

because $\left(\frac{\partial x}{\partial \xi}\right)_{i-1,j}$ is equal to $\left(\frac{\partial x}{\partial \xi}\right)_{(i-1)+1,j}$ and $$\left(\frac{\partial x}{\partial \xi}\right)_{i,j-1} \text{ is equal to } \left(\frac{\partial x}{\partial \xi}\right)_{i,(j-1)+1}.$$

Since the present invention permits the control of numerical simulation with a minimum designation, the number of steps in developing the program can be reduced.

In the present invention, as described in the foregoing, in the course of transforming the partial differential equation and the description of the domain in the real space into the partial differential equation and the description of the domain in the normal space, the terms are selected in accordance with an available memory capacity as to which of the terms in the mapping transformation formulas (2) and (3) for the partial differential equation in the real space should be made to be constants. Then the differential operators contained in the partial differential equation are expanded in the form which can be expressed only by the primary differential, and a given partial differential equation in the real space is mapping transformed into a partial differential equation in the normal space by using the mapping transformation formulas (2) and (3). Following this, a numerical calculation program is automatically generated from the partial differential equation and the description of the domain in the normal space Therefore, it is possible to generate numerical calculation program which can be executed in a short time.

In the determination process of the mapping transformation rule, among the terms ($\partial x/\partial \xi$, $\partial x/\partial \eta$, $\partial y/\partial \xi$, $\partial y/\partial \eta$ and $\partial x/\partial \xi \cdot \partial y/\partial \eta - \partial x/\partial \eta \cdot \partial y/\partial \xi$) in the mapping transformation rules for the partial differential equation in the real space, as to those terms which are to be tabled, a table name is used instead of $\partial x/\partial \xi$, $\partial x/\partial \eta$, $\partial y/\partial \xi$, $\partial y/\partial \eta$ and $\partial x/\partial \xi \cdot \partial y/\partial \eta - \partial x/\partial \eta \cdot \partial y/\partial \xi$. By virtue of this, the values in the table are referenced instead of calculating $\partial x/\partial \xi$, $\partial x/\partial \eta$, $\partial y/\partial \xi$, $\partial y/\partial \eta$ and $\partial x/\partial \xi \cdot \partial y/\partial \eta - \partial x/\partial \eta \cdot \partial y/\neq \xi$ and the partial differential equation in the normal space can be obtained. By automatically generating a numerical calculation program from the above mentioned equation, it is possible to generate the numerical calculation program which is efficient in execution (short calculation time) by making reference to the table values.

The expansion process of the differential operator expands the given partial differential equation to a form in which only primary differential operators are combined. As a result, the mapping transformation rule is necessary only for the primary differential operators.

The expansion process of the mapping transformation rule mapping-transforms the partial differential equation given in accordance with the mapping transformation rule selected by the determination process of the mapping transformation rule. As a result, a work for manually mapping-transforming the partial differential equation is eliminated.

The code generation process of the normal coordinate encodes the partial differential equation in he normal coordinate generated by mapping-transforming the given partial differential equation, and the information relating to the shape of domain.

DESCRIPTION OF THE PREFERRED EMBODIMENTS

An embodiment of the present invention will be described as follows.

Figure 1:
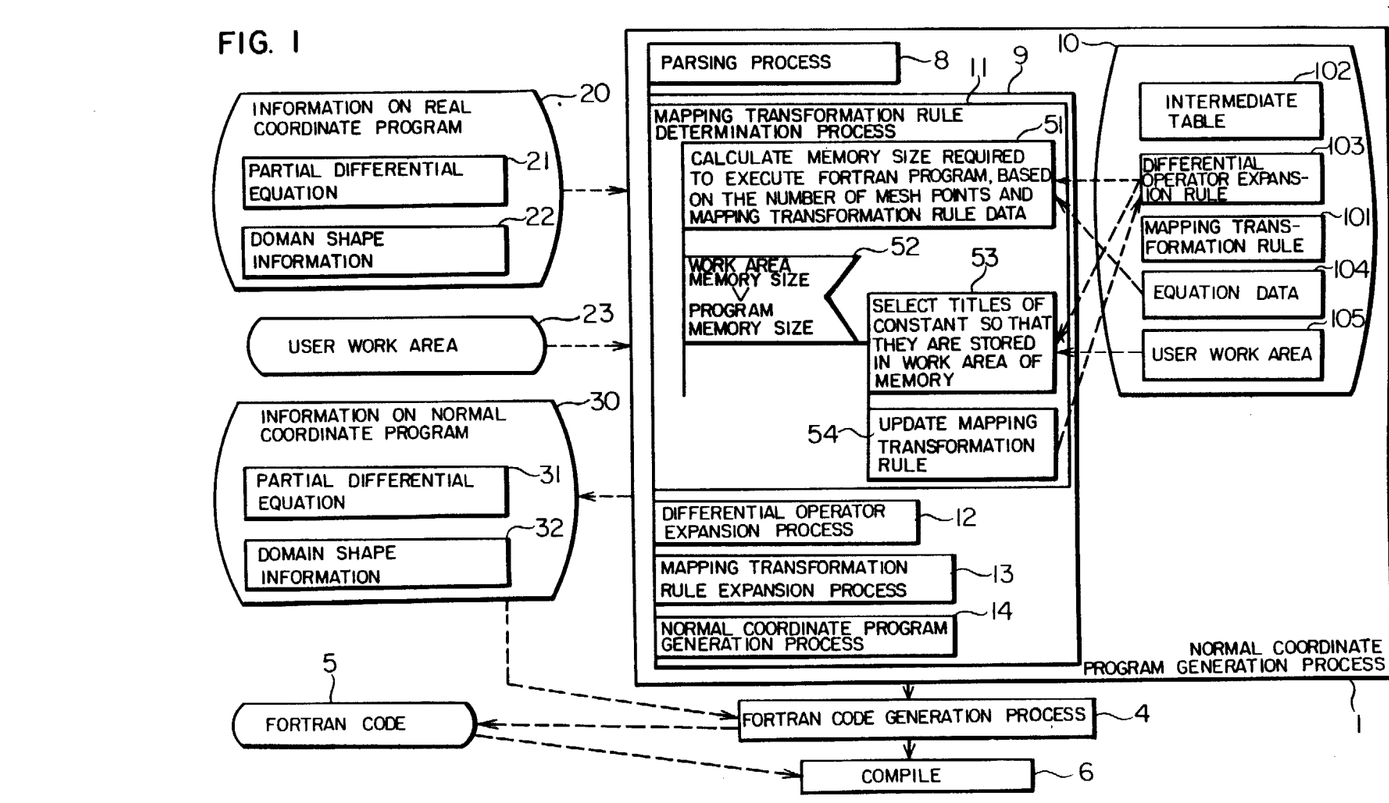
FIG. 1 shows an overall configuration.

FIG. 1 shows steps for automatically generating a calculation program of FORTRAN from a partial differential equation and a description of a domain in a real space, and also an arrangement of an automatic programming system using a boundary-fitted method is illustrated.

An overall flow in the system will be described. When information 20 as to a real coordinate program and a work area 23 of the user are supplied, in a normal coordinate program generation process I, the information 20 as to the real coordinate program is mapping transformed to generate information 30 as to a normal coordinate program. Furthermore, the information 30 as to the normal coordinate program is interpreted into a FORTRAN code 5 in a FORTRAN code generation process 4. The FORTRAN code 5 generated in this manner is executed by a compiler 6.

Figure 12:
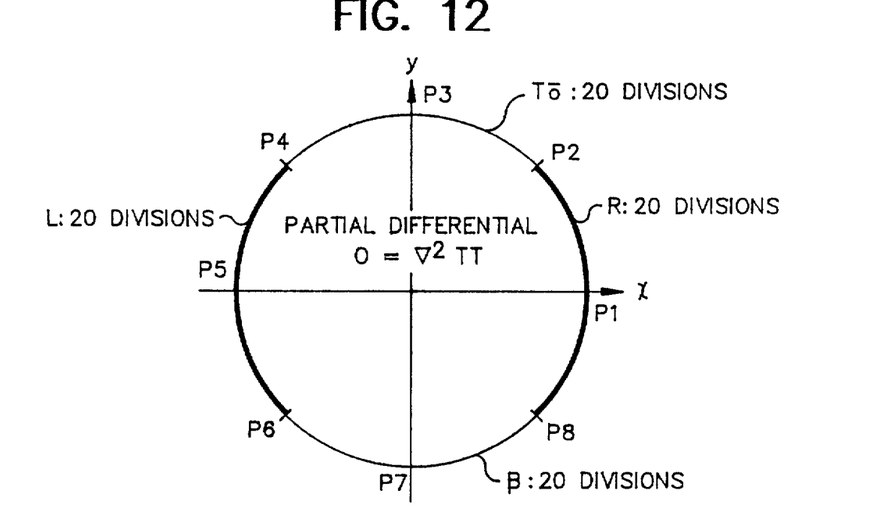
FIG. 12 represents a circular area as selected by the area information 22 of FIG. 2.

The information 20 as to the real coordinate program is a program containing a partial differential equation 21 and domain shape information 22. The detail is shown in FIG. 12.

The information 30 relating to the normal coordinate program is also a program containing a partial differential equation 31 and domain shape information 32.

Reference numeral 23 represents a statement which requires a variable TT to ensure a work area available to the user when the generated FORTRAN code is to be executed.

The normal coordinate program generation process 1 is comprised of a parsing process (syntax analysis) 8 for analyzing the information 20 as to the real coordinate program, a code generation process 9 for mapping transforming the information 20 as to the real coordinate program to generate the information 30 relating to the normal coordinate program, and an intermediate table 10 for storing the result or the syntax analysis, an expansion rule for differential operators, and a mapping transformation rule.

The information 20 relating to the real coordinate program which is input data and the information 30 relating to the normal coordinate program which is output data, and furthermore, the FORTRAN code generation process 4 and the FORTRAN code 5 will be described.

Figure 2:
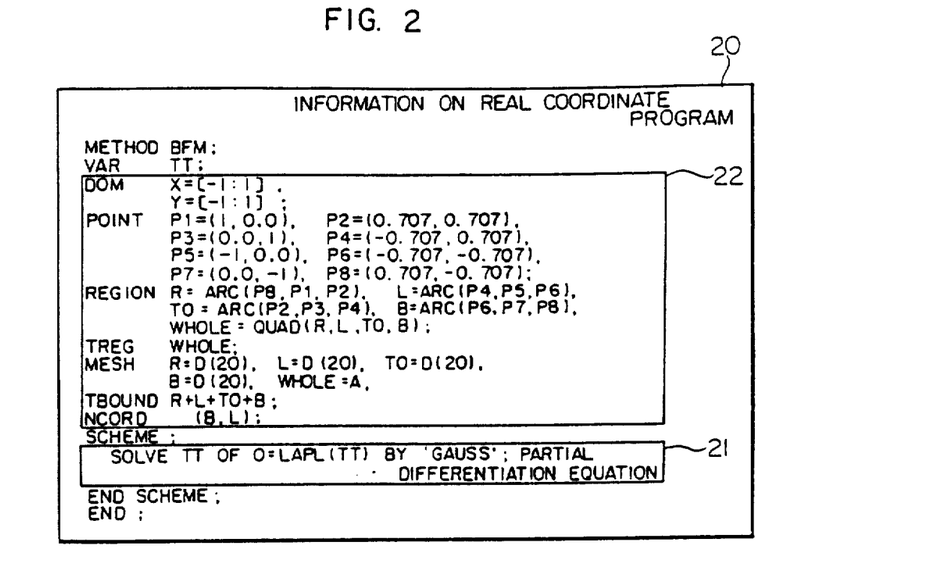
FIG. 2 shows an example of input.

First, with regard to the information 20 relating to the real coordinate program, an example is shown in FIG. 12. In FIG. 12, a circular area in two dimensional coordinate system is shown, and when a partial differential equation $0 = \nabla^2 (TT)$ is established in the circle, a value of TT on a lattice generated within the circle is obtained. In the Figure, P1–P8 represent names of end points, R, L, T and B represent names of areas at the outer fringe. When these are programmed, they are shown in the form of FIG. 2. The information of the shape in FIG. 12 corresponds to area shape information 22 in FIG. 2, and the partial differential equation governing the inside of the circle corresponds to 21 in FIG. 2. The name of variable 23 is a name of variable which has a value of the lattice.

Figure 3:
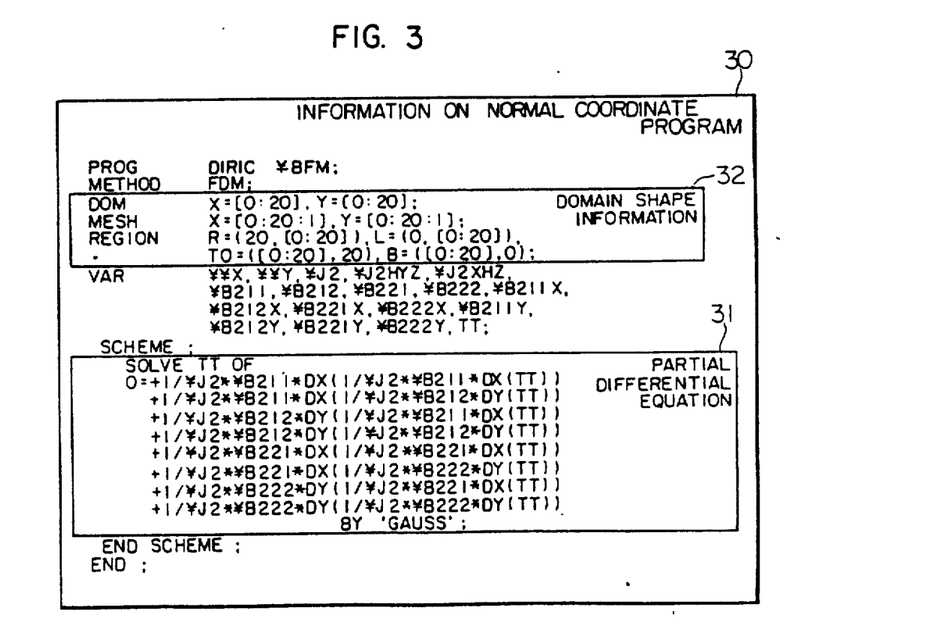
FIG. 3 shows an example of output.
Figure 13:
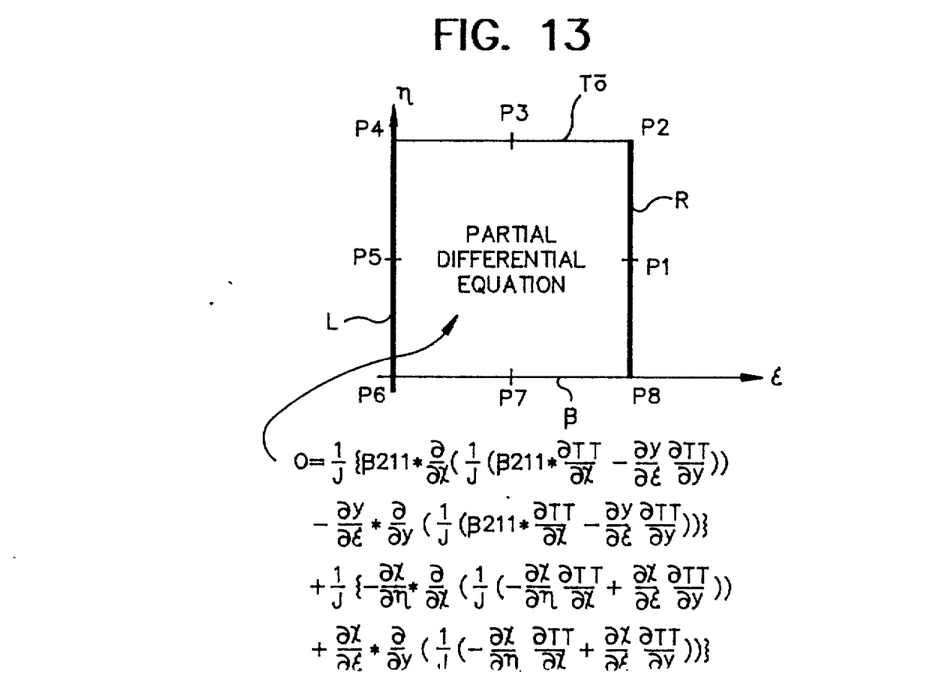
FIG. 13 shows the normal space shape that would result from an input program in FIG. 2; and,
FIG. 14 shows a normalization program.

When the input is supplied, in the normal coordinate program generating process, the information 30 relating to the normal coordinate program shown in FIG. 3 is obtained. In correspondence thereto, the shape and the partial differential equation shown in FIG. 12 are mapping transformed as shown in FIG. 13. The names of respective areas and end points in FIG. 12 correspond respectively to identical names in FIG. 13.

In FIG. 3, the area shape information 32 is program information corresponding to the shape in FIG. 13.

The partial differential equation shown at 31 in FIG. 3 is program information corresponding to the partial differential equation in FIG. 13.

Among the names of variables in 33 in FIG. 3, TT is a name of variable to be obtained. VVX and VVY represent coordinate values of a lattice in the real coordinate system, and these values are referenced at the time of calculation of the partial differential equation. VJ2 and VB211 represent terms in the mapping transformation equation which are to be stored in a table, and these terms are also referenced during calculation of the partial differential equation. In the partial differential equation 31, a formula which makes reference to VJ2 and VB211 is generated. As to VJ2 and VB211, a code 34 is generated for calculation thereof.

The information 30 relating to the normal coordinate program is interpreted into a FORTRAN code 5 in the FORTRAN code generating process 4. The partial differential equation 31 and the calculation code 34 of VJ2 and VB211 shown in FIG. 3 are discretized, and the name of variable 33 is encoded to a FORTRAN code as an arrangement having the size of the number of lattice points since the name of variable 33 s a variable having a value on the lattice point. Accordingly, the discretized code of the partial differential equation in the FORTRAN code 5 which makes reference to VJ2 and VB211 stored in the table.

In the intermediate table 10, a differentiation operator expansion rule 103 and a mapping transformation rule 101 are stored in the table just after initiation of the normal coordinate program generation process 1. Further, equation data 104 is generated during reading of the partial differential equation 21 in the parsing (syntax analysis) process 8, and lattice point information is generated during reading of the domain shape information 22 in the parsing process 8.

Figure 4:
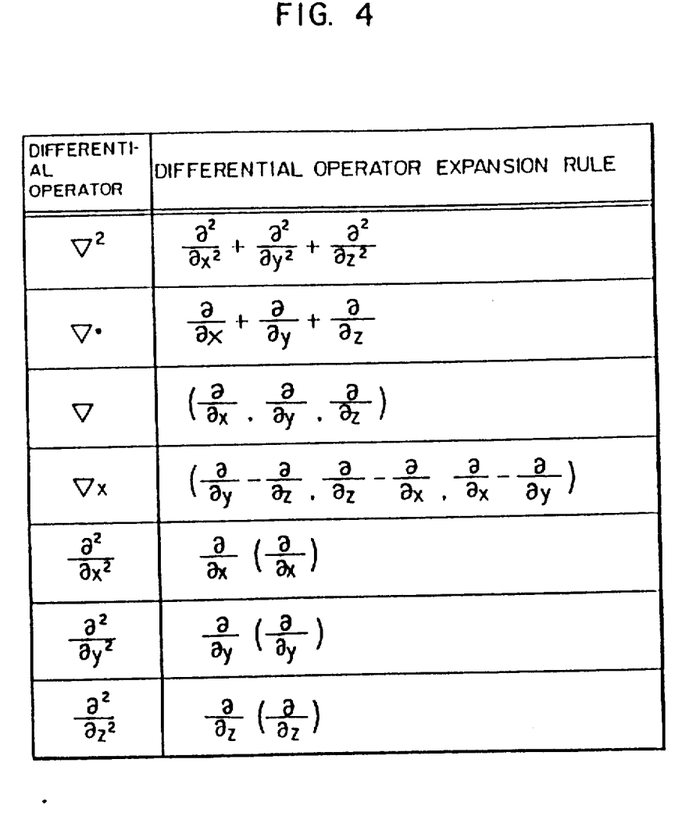
FIG. 4 shows a structure of differential operator expansion rule data.
Figure 5:
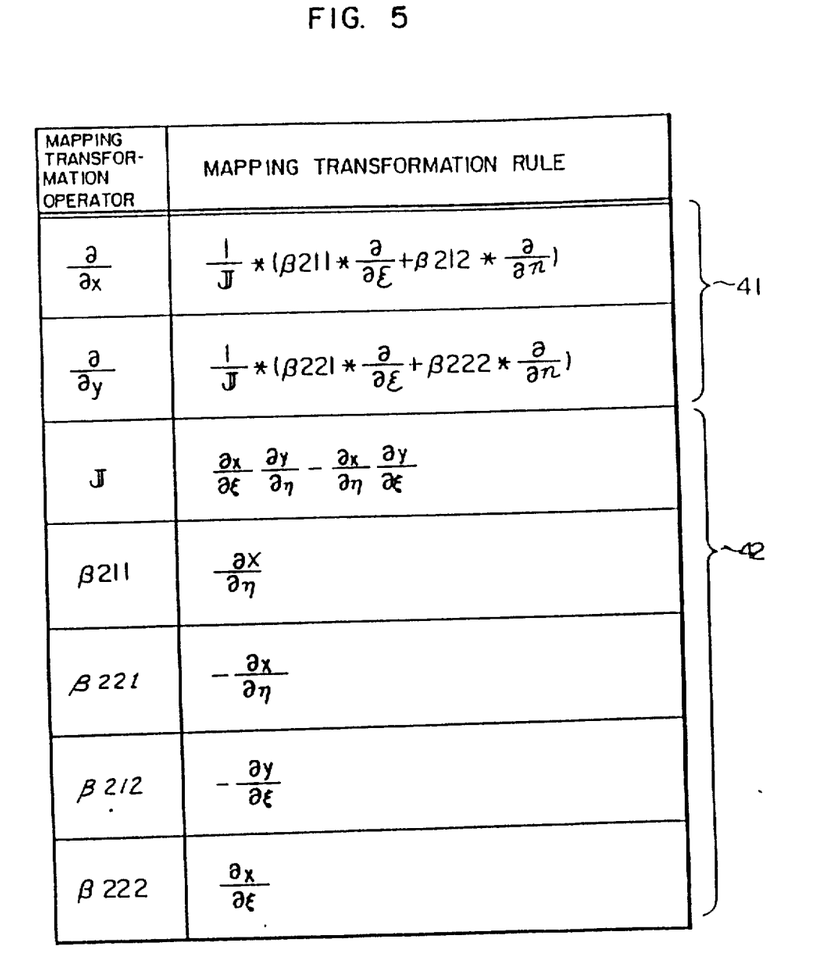
FIG. 5 shows a structure of mapping transformation rule data.

FIG. 1 shows a flow of the normal coordinate code generation process I. Information 20 on the real coordinate code is supplied to the parser 8 which parses it and stores intermediate data in the intermediate table 10. The partial differential equation 21 and the domain shape information 22 are stored in the intermediate table as equation data 101 and mesh point information 104, respectively. The intermediate table also stores therein standard differential operator expansion rule 102 and mapping transformation rule 103, and a user work area 105 given by a parameter during the normal coordinate code generation. FIG. 4 shows a structure of the differential operator expansion rule data, and FIG. 5 shows a structure of the mapping transformation rule data.

In the following code generation process 9, equation information of the normal coordinate and domain shape information are generated based on the generated intermediate table. The code generation process 9 comprises a mapping transformation rule determination process 11 for determining terms to be stored in the table among the terms in the mapping transformation rule for a primary differential operator from the mesh point information 104 and the user work area 105, a differential operator expansion process 12 for transforming any given partial differential equation to a hierarchical combination of primary differential operators, a mapping transformation rule expansion process 13 for mapping-transforming the partial differential equation which is the hierarchical combination of primary differential operators, and a calculation program generation process 14 for coding the equation information of the normal coordinate to a program.

Steps in the code generation process 9 will be explained in detail. In the mapping transformation rule determination process 11, the mapping transformation rule and variables to be put on the work area are determined in accordance with the mesh point information 104 of the physical model and the user work area 105 based on the mapping transformation rule 103 stored in the intermediate table, and the mapping transformation rule data is updated.

Figure 6:
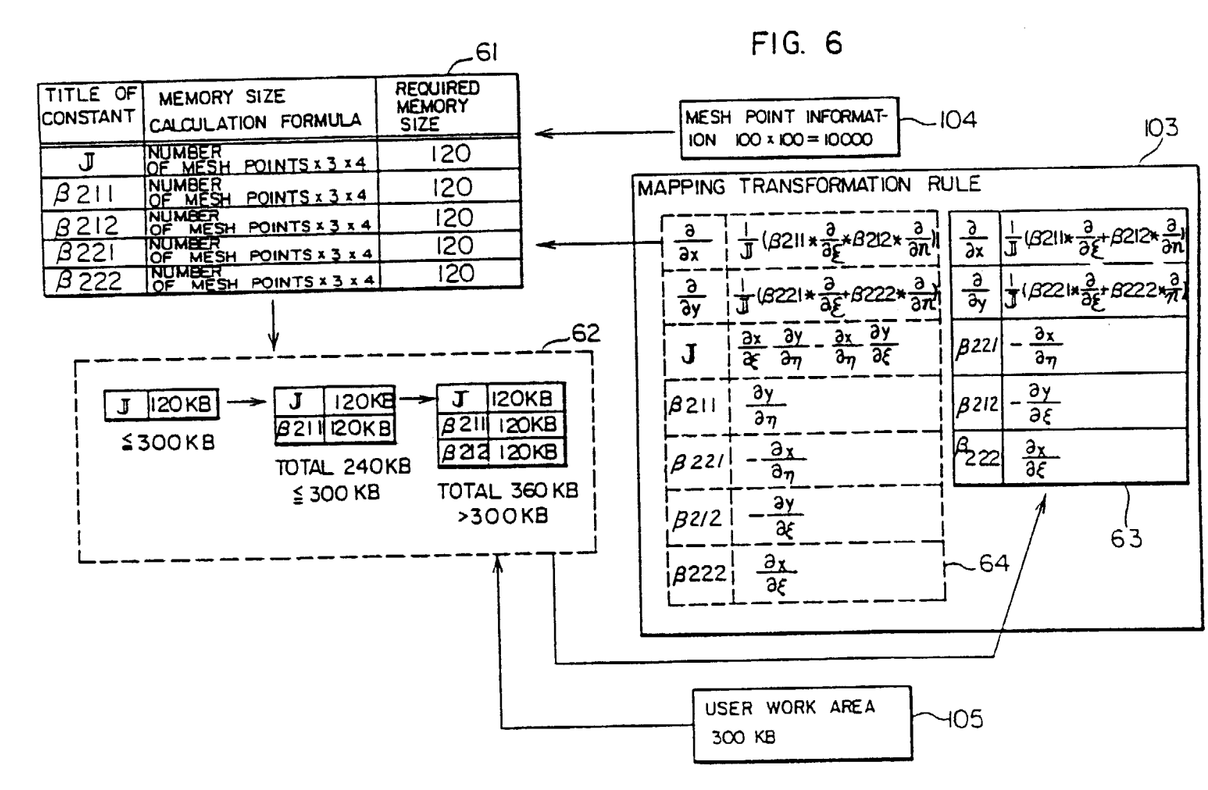
FIG. 6 illustrates an operation of a mapping transformation rule determination unit.
Figure 7:
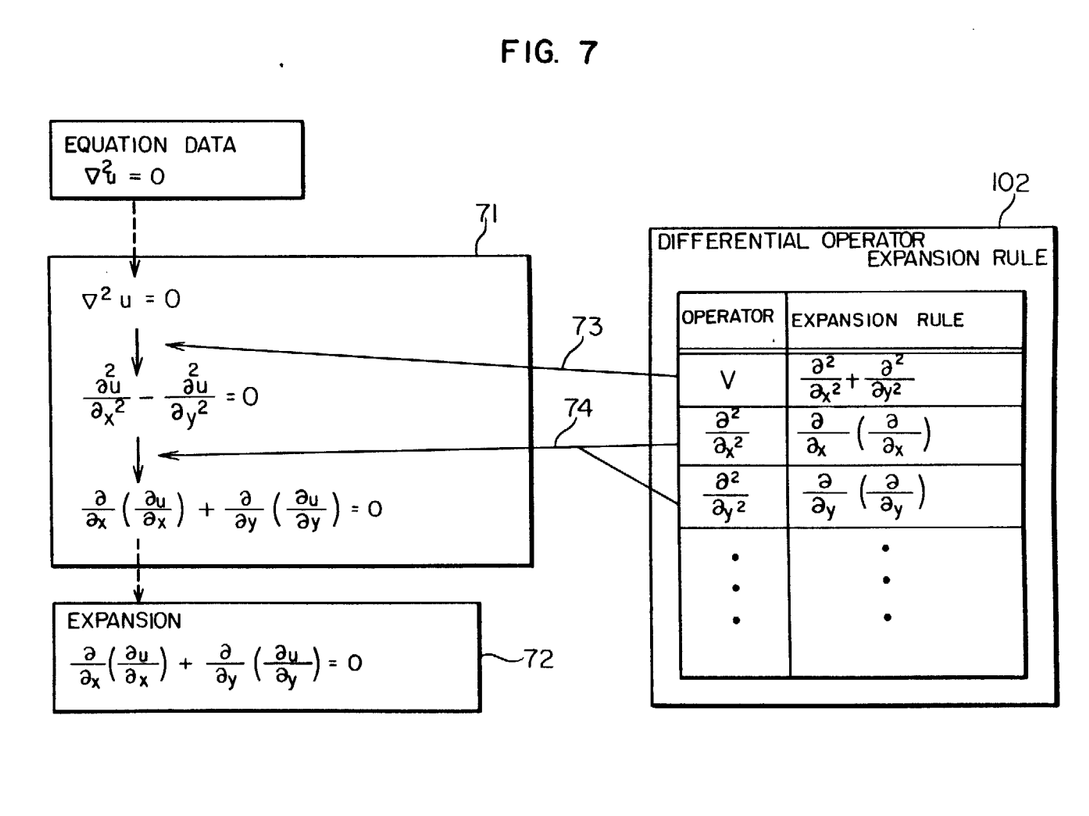
FIG. 7 illustrates an operation of a differential operator expansion unit.

The details of the mapping transformation rule determination process 11 is shown in FIG. 6, the details of the differential operator expansion process 12 if shown in FIG. 7.

The mapping transformation rule 103 is shown in FIG. 5. It holds, in a form of text, primary differential operators and corresponding mapping transformation rule 41, and titles to be held as constants and a calculation rule 42 therefor. In FIG. 5, (x, y) are coordinate variables on the real space $(\xi, \eta)$ are coordinate variables on the normal space, J represents Jacoban, and $\beta_{211}$, $\beta_{212}$, $\beta_{221}$, and $\beta_{222}$ pl represent co-factors of $$\begin{pmatrix} \frac{\partial x}{\partial \xi}, & \frac{\partial y}{\partial \xi} \\ \frac{\partial x}{\partial \eta}, & \frac{\partial y}{\partial \eta} \end{pmatrix}$$

Since J, B211, B212, B221 and B222 are uniquely defined when the coordinate transformations (x, y) and $(\epsilon, \eta)$ on the real space and the normal space are given, they are handled as constants in the mapping transformation rule and put on the work area as the table. Thus, when the numerical calculation program is to be numerically solved, the values thereof may be calculated only once and they are stored in the table.

In the mapping transformation rule determination process 11, the work area necessary for the execution of the FORTRAN numerical calculation program is calculated based on the mapping transformation rule and tho number of mesh points (step 51). A memory size required when the titles which can be handled as constants are put on the memory as the table is calculated. If the calculated memory size for the program s larger than the memory size of the given user work area (step. 52), the titles to be put in the table are selected from the titles which can be handled as constants, within a range of the given user work area (step 53), and the mapping transformation rule in the intermediate table is updated in accordance with the selection (step 54). FIG. 6 illustrates the operation thereof. A memory size required when J, $\beta_{211}$, $\beta_{212}$, $\beta_{221}$, and $\beta_{222}$ are tabled and are put on the memory as the table is calculated in accordance with the mapping transformation rule data 64. Numeral 61 represents calculation formulas for calculating the memory size based on the number of mesh points and the memory sizes required. The required memory size may be calculated by the number of mesh points x 3×4 bytes. If the number of mesh points is 100×100=10,000, as shown at 104, then a memory size of 120 KB per variable or 600 KB in total is required. Based on the calculated memory size, the constants among J, $\beta_{211}$, $\beta_{212}$, $\beta_{221}$, and $\beta_{222}$ to be put on the memory are selected (62). Let us assume that the size of the work memory 105 is of 300 KB which is smaller than the required memory size and only a portion of the constants can be put on the memory. When the constants to be put on the memory are selected in the procedure shown by 62 based on the memory size calculated by 61, two constants, J and $\beta_{211}$ can be put on the memory. The mapping transformation rule 103 is updated based on the selected constants J and $\beta_{211}$. In the present embodiment, when the mapping transformation is conducted by the mapping transformation rule expansion process 13 in FIG. 1, the transformation is hierarchically repeated until the title having the mapping transformation rule disappears in the formula. Accordingly, when the rule is to be updated, the title to be put on the memory and the rule therefor are deleted from the mapping transformation rule data 64. In the present example, J and B$_{211}$ are deleted from the mapping transformation rule 64 to result in the mapping transformation rule 63. The flow of the mapping transformation rule determination process has thus been described.

After the mapping transformation rule has been determined, the given partial differential equation of the real coordinate is mapping-transformed. In FIG. 1, the differential operators in the given equation is expanded (step 12) and the mapping transformation is conducted in accordance with the expansion (step 13).

In the differential operator expansion process 12, the given partial differential equation and boundary condition are expanded by the differential operator expansion rule to transform them to a hierarchical combination of primary differential operators. FIG. 7 illustrates an operation of the differential operator expansion unit 12. It is assumed that $\nabla^2 u = \phi$ as equation data 101 and the differential operator expansion rule data 102 are given. In the present example, the differential operator expansion rule is applied to the differential operator $\nabla^2$ to expand $\nabla^2$ to $$\frac{\partial^2 u}{\partial x^2} + \frac{\partial^2 u}{\partial y^2}$$

(arrow 73), and the expansion rule of $$\frac{\partial^2}{\partial x^2}, \frac{\partial^2}{\partial y^2}$$

is applied to expand $$\frac{\partial^2 u}{\partial x^2} \text{ to } \frac{\partial}{\partial x}\left(\frac{\partial u}{\partial x}\right) \text{ and } \frac{\partial^2 u}{\partial y^2} \text{ to } \frac{\partial}{\partial y}\left(\frac{\partial u}{\partial y}\right)$$

(arrow 74). The expansion rule is applied until a combination of primary differentiations is obtained, to produce an expansion 72.

Figure 8:
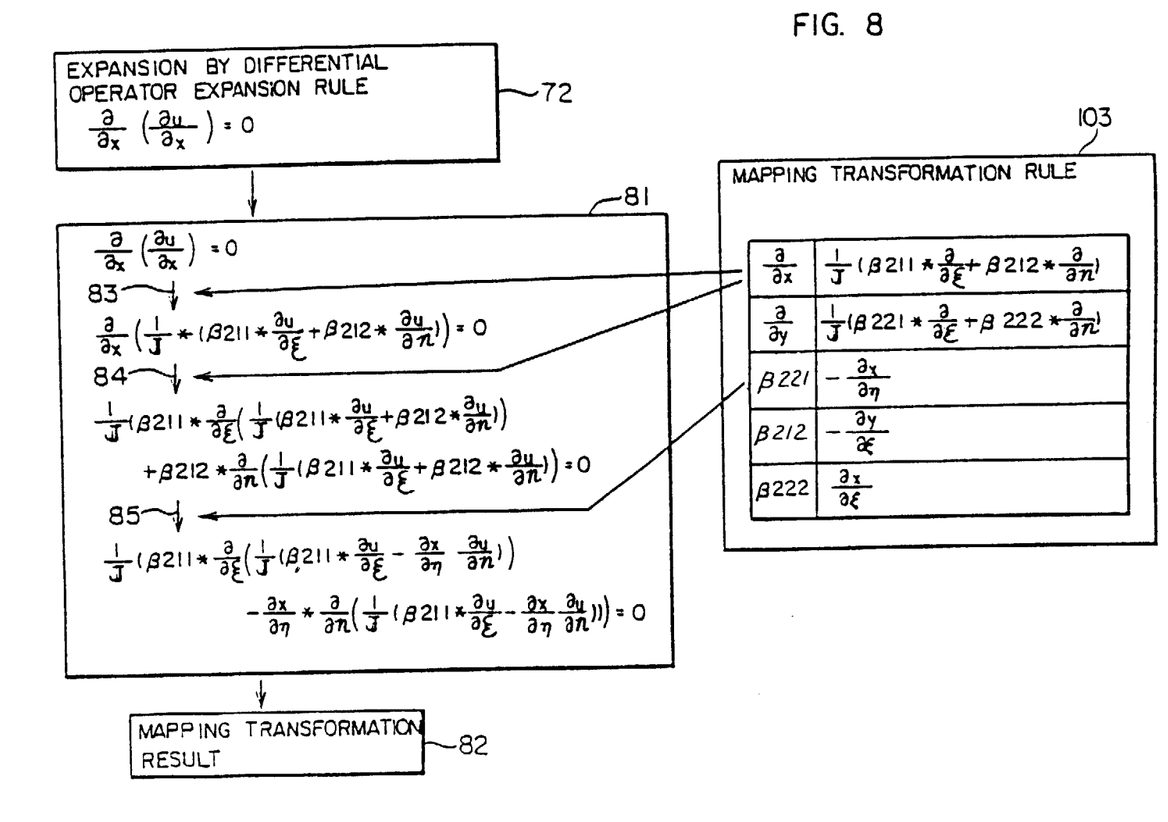
FIG. 8 illustrates an operation of a mapping transformation rule expansion process.

FIG. 8 illustrates an operation of the mappinq transformation rule expansion process. In this process, the partial differential equation 12 expanded to the hierarchical combination of primary differentiations by the differential operator expansion process 12 is transformed by the mapping transformation rule generated by the mapping transformation rule determination process I1 to produce the mapping transformation result 82. In FIG. 8, a block 81 illustrates a process of change of formulas by the mapping transformation rule. As shown in FIG. 8, the mapping transformation is recursively conducted, starting from the inner one, to the expansion of the combination of primary differentiations of the partial differential equation by the differential operator expansion rule. As an example, the mapping transformation rule is applied to the primary differential operator of the partial differential equation. For $$\frac{\partial}{\partial x}\left(\frac{\partial u}{\partial x}\right) = 0,$$

the inner $\partial/\partial x$ is transformed by the transformation rule (arrow 83) and the outer $\partial/\partial x$ is similarly transformed (arrow 84). The outward hierarchical transformation is repeated until all of the primary differential operators to be transformed disappear. After the transformation of tho primary differentiations, the titles other than those which have been determined to be put on the memory are transformed to calculation formulas (arrow 85) to produce the mapping transformation result 82 of the partial differential equation. By outwardly applying the transformation rule, any partial differential equation can be mapping-transformed.

The calculation code generation process 14 generates the partial differential equation modified by the mapping transformation rule and the information 30 on the normal coordinate program including the domain shape information.

FIG. 3 shows a normal coordinate program in the case where Jacobian J and all its co-factors B211, B212, B221, and B222 are made to be constants. Specifically, in the variable statement 33, their variables ¥J2, ¥B211, ¥B212, ¥B221, and ¥B222 are declared (330). At the time of this statement, the computer is requested to ensure an area for storing these variables in the work area in the computer. The statement group 34 defines the values of the variables for calculating the Jacobian J and its co-factors B211, B212, B221, and B222 which are made to be constants in accordance with the original definition formulas (FIG. 5). The block 31 shows a partial differential equation after transformation. Here, the Jacobian J and its co-factors B211, B212, B221, and B222 are represented by the variable names ¥J2, ¥B212, ¥B22, ¥B222.

Furthermore, in FIG. 3, ¥¥X and ¥¥Y are program variables which indicate coordinates $\partial$, $\eta$ in the normal space, and DX (¥¥Y), DY (¥¥X) represent $\partial x/\partial \eta$, $\partial y/\partial \xi$ respectively.

Figure 14:
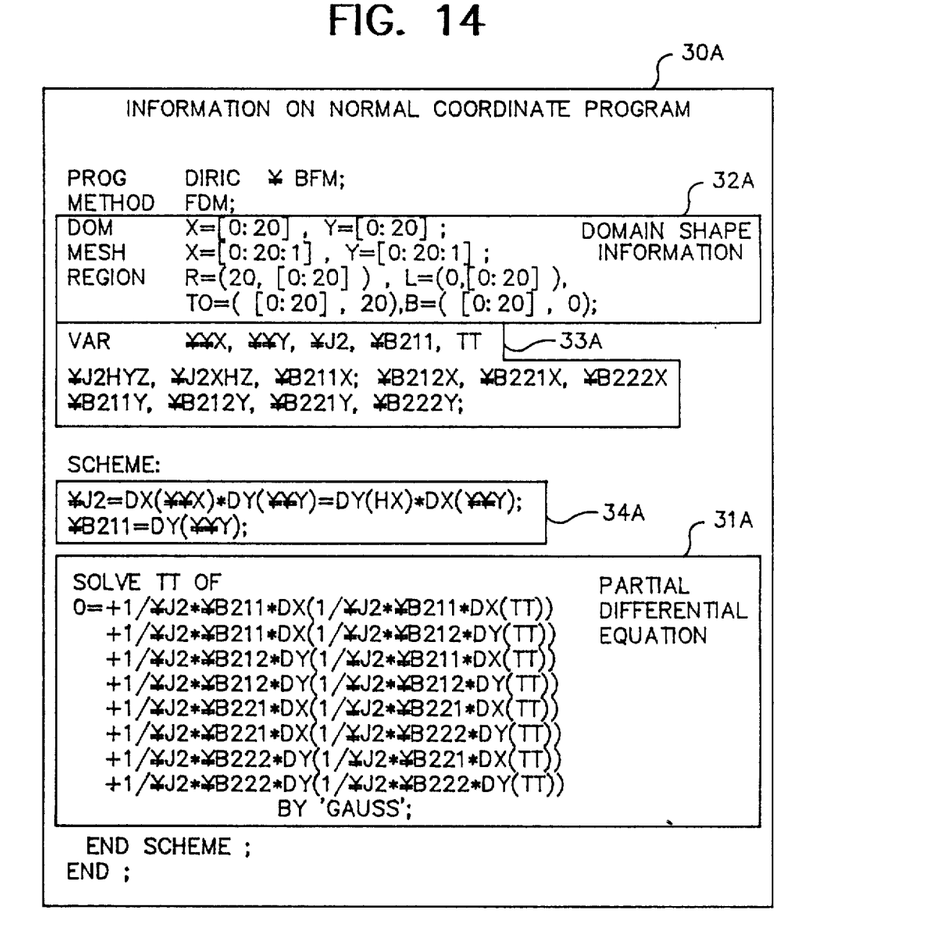

In the mapping transformation described with reference to FIG. 8, Jacobian J and B211 are made to be constants, however, the other co-factors B212, B221 and B222 are not made to be constants. A normal coordinate program generated in the normal coordinate program generation process 14 is shown in FIG. 14.

Specifically, in a Variable statement 33A, variables for Jacobian J and B211 which are made to be constants are declared, a definition statement group 34A defines values of the variables for calculating in accordance with original definition formulas. A partial differential equation after transformation s shown in 31A in which the variable names of Jacobian J and its co-factor B211 which have been made to be constants are utilized.

The generated information 30 on the normal coordinate program is converted to the FORTRAN numerical calculation code 5 by the FORTRAN code generation process 4 and compiled and executed by the FORTRAN compiler 6. The steps 4-6 are known steps. In this FORTRAN program, naturally, it is designed to execute the variable statement 33 (or 33A), definition statement group 34 (or 34A) and the partial differential equation 31 (31A). In this case, in accordance with the variable statement 33 (or 33A), an area for arranged data is retained in the work area in the computer. Then, in accordance with the definition statement group 34 (or 34A), the values of these variables are calculated beforehand with respect to each lattice point of a rectangular domain (FIG. 9) in the normal space. The partial differential equation 31 (or 31A) utilizes repeatedly the result of the calculation as to the Jacobian J and its co-factors which have been made to be constants. Accordingly, since there is no need to calculate the same value repeatedly, the execution speed of the program is fast.

In the Present embodiment, a two-dimension space is handled although it may be a one-dimension or three-dimension space. The above processes may be implemented by either hardware or program.

In accordance with the present invention, since the simulation program is automatically generated based on description which is very close to the physical model to be simulated, a work effort is significantly reduced in comparison with a case where the description is prepared by FORTRAN language. The automatic generation of the simulation program which heretofore been done only by the finite differential method is now attained by the boundary-fitted method and flexible description of the physical model is permitted.

Further, a highly efficient numeric simulation program can be automatically generated by the mapping transformation which takes the memory size into account.

We claim:

1. A method for automatically generating a simulation program, which numerically solves a partial differential equation (original partial differential equation) which governs a physical quantity in a real domain of a non-rectangular shape in a real space, wherein the real partial differential equation is solved according to a boundary-fitted method, the method comprising the steps, executed by a data processing apparatus, of:

(a) transforming the original partial differential equation into a corresponding one which governs the quantity in a rectangular domain in an orthogonal space, wherein the rectangular domain has orthogonal lattice points corresponding to lattice points of the real domain, the transformation including the steps of:

(a1) determining, in response to input of a size of a work area available in a memory of a data processing apparatus which executes a simulation program to be generated, of which one of plural factors the work area can hold a calculation result of a value, for each of the orthogonal lattice points of the rectangular domain, wherein the factors (J, $\partial y/\partial \eta$, $\partial y/\partial \xi$, $\partial x/\partial \eta$, $\partial x/\partial \xi$) are ones which appear in an expression of relation between a primary derivative ($\partial \phi/\partial x$, $\partial \phi/\partial y$) of the physical quantity with respect to each coordinate variable (x; y) of the real space and primary derivatives ($\partial \phi, \partial \xi$, $\partial \phi/\partial \eta$) of the physical quality each with respect to one of coordinate variables ($\xi$, $\eta$) of the orthogonal space;

(a2) replacing derivatives with respect to each coordinate variable (x; y), within the original partial differential equation each by the expression of relation, so as to obtain a corresponding partial differential equation, wherein the determined one factor is expressed by a variable instead of an original expression thereof:

(b) generating a first program statement which requests seizure of data area in the work area, for the variable and a second program statement which defines a value of the variable by means of an original expression of the one factor;

(c) transforming the corresponding partial differential equation and the first and second program statements into a simulation program which comprises program statements executable in the data processing apparatus which executes the simulation program wherein the program statements are constructed so as to solve the corresponding partial differential equation in such a manner that a value of the variable is first calculated for each of the orthogonal lattice points in the rectangular domain and held in an array data area of the work area and thereafter values of the variable for various orthogonal lattice points are fetched therefrom when the values are required during calculation for solving the corresponding partial differential equation; and, (d) compiling the simulation program to generate a executable program.

* * * * *

UNITED STATES PATENT AND TRADEMARK OFFICE
CERTIFICATE OF CORRECTION

PATENT NO. : 4,972,334
DATED : 11/20/90
INVENTOR(S) : Michiru Yamabe et al

It is certified that error appears in the above-identified patent and that said Letters Patent is hereby corrected as shown below:

In claim 1, column 12, lines 25 and 26, please delete the equation and insert therefor -- $(J, \partial y/\partial \eta, \partial y/\partial \xi, \partial x/\partial \eta, \partial x/\partial \xi)$ --.

In claim 1, column 12, lines 30 and 31, please delete the equation and insert therefor -- $(\partial \phi/\partial \xi, \partial \phi/\partial \eta)$ --.

Signed and Sealed this

Seventeenth Day of November, 1992

Attest:

DOUGLAS B. COMER

Attesting Officer

Acting Commissioner of Patents and Trademarks